June 17, 1969  L. E. HENNESSY  3,450,594

LAMINATED-PRODUCT AND PROCESS FOR PREPARING SAME

Filed June 29, 1965

INVENTOR
LEO E. HENNESSY

BY
Oberlin, Maky & Donnelly
ATTORNEYS

United States Patent Office 3,450,594
Patented June 17, 1969

3,450,594
LAMINATED PRODUCT AND PROCESS FOR PREPARING SAME
Leo E. Hennessy, Chagrin Falls, Ohio, assignor to Industrial Electronic Rubber Company, Twinsburg, Ohio, a corporation of Ohio
Filed June 29, 1965, Ser. No. 468,060
Int. Cl. B32b 27/42, 27/38, 25/08
U.S. Cl. 161—184                    5 Claims

ABSTRACT OF THE DISCLOSURE

A laminated product of a type particularly suited for use as a shock absorber in the brush assembly of electric generators or motors. The laminate includes a rigid load-bearing surface of a thermosetting plastic and a resilient surface of a rubber compound bonded directly together. The thermosetting plastic and the rubber compound are mutually soluble and compatibly curable one with another.

---

Figure 1:
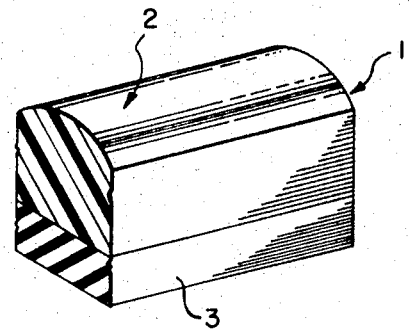

This invention relates generally as indicated to a laminated product and more particularly to such a product in the form of a shock absorber for use in the brush assembly of electric generators or motors and to a process for producing such products.

It has long been known that certain thermosetting plastic materials may be intermixed with various rubber compounds and molded into numerous articles of manufacture. Over the years, however, it has been the common practice to bond a preformed rubber sheet to a preformed thermosetting plastic sheet with a bonding agent to form a laminated product of such materials, as it has not been considered possible to successfully mold directly such a laminated product.

Various reasons have been ascribed for such inability, with one supposition being that the available rubber compounds require certain ingredients for chemical stability, which are naturally present or admixed therewith, which have anti-oxidizing or oxidation-inhibiting properties. Illustrative of such ingredients are amines such as phenyl-beta-naphthylamine, other nitrogen-containing materials such as polymerized trimethyl dihydroquinoline, and various quinone compounds. Since these materials inhibit oxidation and since certain of the commonly used thermosetting resins require oxidizing agents such as a peroxide for curing or cross-linking, they interfere with the curing or cross-linking at the interface between the thermosetting resin and the rubber and thus result either in no bonding or in extremely weak bonding.

Laminated products of such materials are very desirable, however, since they may have a rigid backing of the thermosetting plastic and yet have a resilient surface of the rubber compound. Such products have great usefulness in applications where it is necessary to have a long wearing, hard load-bearing surface and also a surface which is capable of yielding and reducing vibration and absorbing shock. One such use is in electric generators or motors, wherein a shock absorber is fitted between the carbon brush and a spring which pushes the brush down onto the commutator and thus takes up the shock between the brush and the commutator to reduce chipping or breaking of the carbon brush and also to reduce arcing.

Prior attempts to overcome the above-described difficulty in making such laminates have been directed at the concept of incorporating oxidizing agents into the rubber to overcome the inherent anti-oxidizing properties. While the desired laminates may be produced in this manner, the cost production is increased considerably and is also complicated in view of the necessity of using oxidizing agents such as benzoyl peroxide which are difficult to control in their chemical reactivity.

It is an object of the present invention therefore to provide such a laminated product, and particularly one in the form of a shock absorber which is comprised of a laminate of a rigid thermosetting plastic and a resilient rubber compound bonded directly thereto.

Another object of this invention is the provision of such a laminated product in which these materials may be laminated directly without the inclusion of oxidizing or other agents of the type mentioned above.

It is an additional object of this invention to provide a laminated product of the type described without the use of bonding agents.

Yet another object is the provision of a process for producing such products in which the thermosetting plastic and the rubber compound may be concurrently cured.

Other objects, features and advantages of this invention will be apparent to those skilled in the art after a reading of the following more detailed description.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 2:
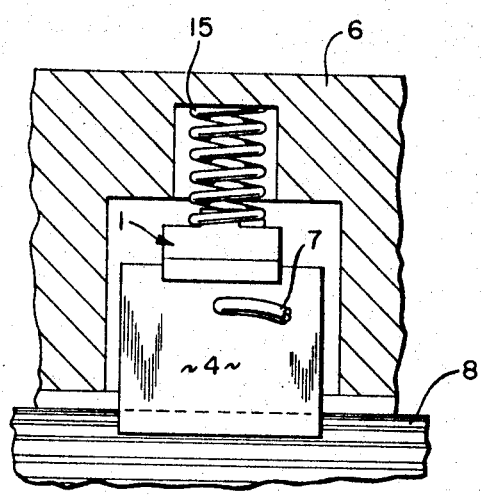

In said annexed drawing:
FIG. 1 is a perspective view of a shock absorber embodying the concept of this invention; and
FIG. 2 is a fragmentary partially sectioned view of such shock absorber in position in an electric motor.

The above and other objects are achieved by means of this invention in which such a product is provided which comprises a laminate of a rigid thermosetting plastic and a resilient rubber compound which is mutually soluble with the thermosetting plastic, the thermosetting plastic being bonded directly to the rubber compound. As will be appreciated more fully from the following description, such product may be produced without any additional compounding agents or techniques.

Referring now more particularly to the drawing, a shock absorber is indicated generally by the numeral 1 and is shown as comprising a rigid load-bearing surface 2 and a resilient rubber surface 3 which is bonded directly thereto. The particular configuration of the shock absorber will, of course, vary depending upon the particular application in which it is to be used. It is inserted, as shown in FIG. 2, between carbon brush 4 and resilient spring 15 within brush holder 6 and is positioned with the rubber surface in contact with the brush. An electrical connection of standard construction is connected to the brush as shown at 7, and the brush is seated on a commutator 8 in the usual manner.

The rigid thermosetting material which is suitable for use in this invention may be any of those available which are capable of providing a rigid load-bearing surface of the type desired and which have a degree of "mutual solubility" with the rubber compopund, as will be explained more fully hereinafter. Illustrative of such thermosetting resins are phenolic resins such as phenol-formaldehyde and phenol furfuryl, melamine-formaldehyde, urea-formaldehyde and various epoxy resins, such as Pacific Resins "EMC–91" or Furan Plastics "Epocast 403."

Numerous rubber compounds may be used herein with illustrative examples including chlorosulfonated polyethylene which is available under the trade name "Hypalon" (see U.S. Patent 2,586,363 for a disclosure of such rubber), natural rubber, butadiene-styrene copolymers, butadiene-isoprene copolymers, neoprene, polyisoprene, butadiene-acrylonitrile copolymers (Buna N rubbers) and a fluoro elastomer, hexafluoropropylene vinylidene fluoride copolymer, available under the "Viton" trade name.

As mentioned, the thermosetting resin and the rubber compound are to be mutually soluble with one another, that is, they are to be capable of dissolving one within the other to some extent during molding to produce a fluid solution. Also, there is to be no interference between their respective curing systems, i.e., these materials are to have chemical curing conditions in which the catalyst or cross-linking agent used is common or compatible to both materials. As an example, with a phenol-formaldehyde and Viton system, an amine is used as the curing or cross-linking agent for both materials, and thus when heated to the appropriate temperature and pressure, the rubber flows and bonds directly to the phenol-formaldehyde through the amine cross-linking agent. Because of such mutual solubility and compatible curing systems, the materials will cure in the same general temperature range and consequently go through the same plastic range at the same time whereby a chemical bond is developed therebetween. In general, the more nearly alike the two materials are in their solubility and curing conditions, and hence the more mutually soluble they are, the stronger the bond which will be achieved.

Various reinforcing materials may be admixed with the thermosetting resin, such as cellulosic or other natural vegetable fibers, glass fibers, synthetic fibers, or metallic fibers. A woven fabric of any of these reinforcing materials may also be employed, if desired.

An especially suitable reinforcing material is cellulosic fibers in paper form which is commercially available, one source being the Rogers Corporation, which markets it under the trade names RM 9725 and Duroid 850. Such material is in the form of a preformed, partially cured composite board of cellulosic fibers and phenol-formaldehyde which is formed from a solution of phenolic resin containing such fibers, with a plurality of layers being laid down to form a laminated board. After formation of the board, it is subjected to a partial curing treatment at low heat and pressure.

The use of such reinforced preformed board has an especial advantage in that the bond between it and the rubber is strengthened due to mechanical interlocking which is achieved between the fibrous board and the rubber. Since such board has small fibers of cellulose protruding slightly from its surface, the surface of the board is thus relatively porous and the rubber will consequently flow around the fibers and into the porous surface thereby creating such mechanical interlocking.

To form the desired laminate of this invention, the partially cured, cellulosic fibrous reinforced board described above may be placed in a suitable mold, a layer of rubber placed thereon and sufficient pressure and heat applied as by compression molding to soften the rubber and thus cause it to flow into the porous plastic matrix and to be cured concurrently with the board. Since the mass is thus fully compressed, firm mechanical interlocking as well as the above-described chemical bonding is achieved.

The laminated product may also be transfer molded in which the preformed board is placed into the cavity of an injection molding device and the rubber material injected thereinto, with heat and pressure being applied to cure and bond.

The temperature to be employed for curing and bonding is, of course, dependent upon the particular materials being used, the individual compound formulations, the resin content of the preformed board and the type of filler in such board, and the degree of solubility between the rubber and the plastic. With a phenol-formaldehyde reinforced board of the type described above and a chlorosulfonated polyethylene system, approximately 300° F. and about 2,000 p.s.i. pressure for approximately 20 minutes are sufficient to achieve the desired bonding.

The invention will be better understood by reference to the following specific but non-limiting example.

Example

A partially cured cellulosic fiber reinforced phenol-formaldehyde RM 9725 board of the type previously described purchased from the Rogers Corporation of approximately 6" x 6" x ⅛" and comprising approximately 60 percent by weight of cellulosic fibers was placed into the mold of a compression molding device and a layer of chlorosulfonated polyethylene (purchased from the E. I. du Pont de Nemours Company under the trade name "Hypalon") was placed in the mold on top of the fibrous board. The temperature within the mold was set at approximately 300° F., and the pressure within the mold was approximately 2,000 p.s.i. After approximately 20 minutes, the mold was opened, and the product was permitted to cool to room temperature.

The product thus produced was found to have the chlorosulfonated polyethylene firmly bonded to the phenol-formaldehyde reinforced board. The product was thereafter tested as a shock absorber in the brush assembly of an electric generator, and it was found to be satisfactory in all respects.

Many laminated articles of this type may be produced in addition to the shock absorbers described above. In general, such laminated products may be used in any application where a metal-to-rubber composition is now used which could be replaced by a plastic-to-rubber composition, since the thermosetting resin has sufficient rigidity, chemical and heat resistance, dimensional stability, etc. to be readily used in place of metal. Such applications are as a transmission seal on automobiles; as reinforcement in a seal cup to give resistance to deformation in fuels; as a drive wheel, for example, for the turntable in phonographs; or as a seal and cover arrangement as a plastic cup or cover with a rubber seal mounted thereon, such as in fuse boxes for automotive or boat use or in other automotive mountings like lamp bases, connector fittings, etc.

Other modes of applying the principle of the invention may be employed, change being made as regards the details described, provided the features stated in any of the following claims, or the equivalent of such, be employed.

I, therefore, particularly point out and distinctly claim as my invention:

1. A laminated product comprising a rigid load-bearing composite board of a thermosetting plastic with fibrous reinforcing material therein chemically bonded directly to a resilient surface of a rubber compound, said thermosetting plastic and said rubber compound, prior to bonding, being mutually soluble and compatibly curable one with another.

2. The laminated product of claim 1 in which said composite board is a phenolic resin with fibrous cellulosic reinforcing material therein.

3. The laminated product of claim 1 in which said plastic is selected from the group consisting of phenolic compounds, melamine-formaldehyde, urea-formaldehyde, and epoxy resins.

4. The laminated product of claim 1 in which said rubber compound is selected from the group consisting of chlorosulfonated polyethylene, natural rubber, butadiene-styrene copolymers, butadiene-isoprene copolymers, neoprene, polyisoprene, butadiene-acrylonitrile copolymers and fluoro elastomers.

5. In a method of making a laminated product, the steps comprising compressing a partially cured preformed composite board of a thermosetting plastic with fibrous reinforcing material therein and a layer of a resilient rubber compound in contact with said composite board, and concurrently curing said composite board and said layer of resilient rubber compound, said thermosetting plastic and said rubber compound, prior to bonding, being mutually soluble and compatibly curable one with another to bond chemically the rubber directly to said composite board.

References Cited

UNITED STATES PATENTS

| | | | |
|---|---|---|---|
| 3,388,458 | 6/1968 | Logan | 310—43 X |
| 2,643,207 | 6/1953 | Entwistle | 161—241 |
| 2,746,898 | 5/1956 | Buckwalter et al. | 161—188 X |
| 2,780,574 | 2/1957 | Ott et al. | 161—248 X |
| 2,852,413 | 9/1958 | Tischbein | 117—139 X |
| 2,957,794 | 10/1960 | Shetterly et al. | 161—184 X |
| 2,976,256 | 3/1961 | Whittier et al. | 117—139 X |
| 3,042,545 | 7/1962 | Kienle et al. | 117—75 |
| 3,308,007 | 3/1967 | Shepard | 161—241 |
| 2,879,252 | 3/1959 | Been et al. | 260—45.5 |
| 2,899,397 | 8/1959 | Aelong et al. | 260—18 |

HAROLD ANSHER, *Primary Examiner.*

U.S. Cl. X.R.

161—188, 291, 248; 156—306, 315; 310—251, 252, 43; 117—77, 139, 138.8, 161, 163